US010116897B2

(12) United States Patent
Lee et al.

(10) Patent No.: US 10,116,897 B2
(45) Date of Patent: Oct. 30, 2018

(54) PHOTOMETRIC STABILIZATION FOR TIME-COMPRESSED VIDEO

(71) Applicant: Adobe Systems Incorporated, San Jose, CA (US)

(72) Inventors: Joon-Young Lee, Milpitas, CA (US); Zhaowen Wang, San Jose, CA (US); Xuaner Zhang, Emeryville, CA (US); Kalyan Krishna Sunkavalli, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/446,906

(22) Filed: Mar. 1, 2017

(65) Prior Publication Data

US 2018/0255273 A1    Sep. 6, 2018

(51) Int. Cl.
| | |
|---|---|
| *H04N 7/01* | (2006.01) |
| *H04N 9/79* | (2006.01) |
| *H04N 9/64* | (2006.01) |
| *G11B 27/00* | (2006.01) |
| *H04N 5/235* | (2006.01) |

(52) U.S. Cl.
CPC ......... *H04N 7/0132* (2013.01); *G11B 27/005* (2013.01); *H04N 5/2357* (2013.01); *H04N 9/646* (2013.01); *H04N 9/7908* (2013.01)

(58) Field of Classification Search
CPC .... H04N 7/0132; H04N 5/2357; H04N 9/646; H04N 9/7908; G11B 27/005
See application file for complete search history.

(56) References Cited

U.S. PATENT DOCUMENTS

| | | | |
|---|---|---|---|
| 9,787,902 B1* | 10/2017 | Beysserie | H04N 5/23258 |
| 2005/0179784 A1* | 8/2005 | Qi | H04N 5/145 |
| | | | 348/208.1 |

(Continued)

OTHER PUBLICATIONS

Bonneel,"Example-Based Video Color Grading", ACM TOG (Proc. SIGGRAPH), 32(4):39:1-39:12,, Jul. 2013, 11 pages.

(Continued)

*Primary Examiner* — Hung Q Dang
*Assistant Examiner* — Sunghyoun Park
(74) *Attorney, Agent, or Firm* — Wolfe-SBMC (57) ABSTRACT

Photometric stabilization for time-compressed video is described. Initially, video content captured by a video capturing device is time-compressed by selecting a subset of frames from the video content according to a frame sampling technique. Photometric characteristics are then stabilized across the frames of the time-compressed video. This involves determining correspondences of pixels in adjacent frames of the time-compressed video. Photometric transformations are then determined that describe how photometric characteristics (e.g., one or both of luminance and chrominance) change between the adjacent frames, given movement of objects through the captured scene. Based on the determined photometric transformations, filters are computed for smoothing photometric characteristic changes across the time-compressed video. Photometrically stabilized time-compressed video is generated from the time-compressed video by using the filters to smooth the photometric characteristic changes.

20 Claims, 6 Drawing Sheets

(56) References Cited

U.S. PATENT DOCUMENTS

2006/0015496 A1* 1/2006 Keating .............. G06F 17/3025
2009/0295930 A1* 12/2009 Deng ................. H04N 5/23248
　　　　　　　　　　　　　　　　　　　　　　348/208.99
2016/0037073 A1* 2/2016 Mills ................. H04N 5/23258
　　　　　　　　　　　　　　　　　　　　　　348/208.2

OTHER PUBLICATIONS

Farbman,"Tonal Stabilization of Video", ACM Transactions on Graphics (TOG), vol. 30, Aug. 2011, 9 pages.
Rubner,"The Earth Mover's Distance as a Metric for Image Retrieval", International journal of computer vision, 40(2), Nov. 2000, 20 pages.

* cited by examiner

PHOTOMETRIC STABILIZATION FOR TIME-COMPRESSED VIDEO

BACKGROUND

Device users increasingly capture digital photos and videos with a wide variety of devices, such as dedicated digital cameras, mobile phones, tablet devices, laptops, and so on. However, videos captured using those devices can exhibit temporal variations in color and tone, which can be caused by scene changes involving high-frequency variations in scene illumination as well as automatic adjustments the devices make to imaging characteristics such as white balance and exposure. When the videos are time-compressed via sampling (e.g., to create a timelapsed or hyperlapsed video), however, the temporal variations may be exacerbated. This may appear to a viewer as if the video is flickering, which may be visually unpleasant and distract the viewer from the actual content of the video.

Some conventional techniques for removing or reducing drastic illumination changes in video are designed for real-time (as opposed to time-compressed) videos. However, such conventional techniques may be based on significant overlap of content between adjacent frames, e.g., because most of the frames are not removed as in time-compressed videos. These techniques may be unsuitable with time-compressed videos though, because the changes in content captured between frames of time-compressed videos can be much more significant than the changes in real-time videos, e.g., captured objects may not appear in adjacent frames of time-compressed videos or may appear in just a couple of adjacent frames.

SUMMARY

To overcome these problems, time-compressed videos are photometrically stabilized in a digital medium environment. Initially, original video captured by a video capturing device is time-compressed by selecting a subset of frames from the original video according to a frame sampling technique. Photometric characteristics are then stabilized across the frames of the time-compressed video. This involves determining correspondences of pixels in adjacent frames of the time-compressed video. Photometric transformations are then determined that describe how photometric characteristics (e.g., one or both of luminance and chrominance) change between the adjacent frames, given movement of objects through the captured scene. Based on the determined photometric transformations and a measure of photometric similarity between the frames, filters can be computed for smoothing photometric characteristic changes across the time-compressed video. Photometrically stabilized time-compressed video is then generated from the time-compressed video, in part, by using the filters to smooth the photometric characteristic changes.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures.

DETAILED DESCRIPTION

Overview

Many devices that are used to capture videos can automatically adjust imaging characteristics, such as white balance and exposure. Generally, this enables the devices to capture video of objects in a scene under changing lighting conditions and to capture moving objects. In some instances, though, these automatic adjustments can result in temporal variations in color and tone, as can scene changes having high-frequency variations in illumination that are imperfectly corrected by the automatic adjustments. When the videos are time-compressed via sampling (e.g., to create a timelapsed or hyperlapsed video), the temporal variations may be exacerbated. This may appear to a viewer as if the video is flickering, which may be visually unpleasant and distract the viewer from the actual content of the video. As used herein, "time-compressed" refers to a characteristic describing videos that appear as if they are being played back fast-forwarded (as opposed to real-time playback). Using time-compressing techniques, for instance, video that is captured continuously over several hours may be compressed into just a few minutes or several seconds for playback.

To overcome the above-noted problems, time-compressed videos are photometrically stabilized in a digital medium environment. In one or more implementations, a time-compressed video is initially generated from an original video using a frame sampling technique. One example frame sampling technique is uniform sampling, which involves simply selecting every $x^{th}$ frame of the original video (e.g., every $8^{th}$ frame) for the time-compressed video. Other sampling techniques may also be used to select a subset of frames of an original video for generating a time-compressed video. As described in more detail below, for instance, photometrically stable frame sampling may also be used to select frames from an original video.

Regardless of a particular technique used to compress the video, once time-compressed, the described techniques stabilize photometric characteristics of the video. As mentioned above, time-compressed videos may appear to flicker, e.g., by having relatively dark and relatively light frames in temporal proximity. In general, the photometric stabilization described herein removes or reduces photometric characteristic changes that cause time-compressed video to flicker and, also, are due to automatic adjustments made by a video capturing device, e.g., adjustments to white balance or exposure. However, the described photometric stabilization is also configured to keep photometric characteristic changes that are due to actual content changes of the video, such as different objects being introduced into or leaving the captured scene (e.g., a car driving through), objects moving through the scene, and so forth.

To stabilize the photometric characteristics of a time-compressed video, the described techniques initially determine correspondences between frames of the time-compressed video. For example, a group of pixels in a first frame that capture a headlight of a car are determined as correspondences with a group of pixels in a second frame that capture the headlight. Once correspondences are determined, an alignment transformation is computed that describes how the frames can be adjusted (e.g., through scaling, panning, rotation, etc.) so that the correspondences align. Once aligned, a subset of corresponding pixels is sampled for photometric characteristic values, e.g., one or both of luminance and chrominance. Photometric transformations are then computed between pairs of the frames that indicate how the photometric characteristics of the correspondences change from one frame to another.

Based on the determined transformations, the described techniques compute filters for smoothing photometric characteristic changes across the frames of the time-compressed video, e.g., so that photometric characteristic changes due to automatic camera adjustments are removed or at least reduced. The techniques may do so, in part, by computing weights for the determined transformations, which can be combined to indicate how much influence transformations between frames in a neighborhood of frames have on the photometric characteristics of given frame of the neighborhood.

By way of example, the techniques can compute an identity weight, which penalizes neighboring frames of a given frame having different photometric characteristics. A temporal weight may be used to penalize frames more that are temporally further from a given frame. A content-aware weight may penalize frames having similar content to a given frame (e.g., similar objects captured), but different photometric characteristics. However, the content-aware weight may not penalize (or do so to a lesser degree) frames that have different photometric characteristics but also have different content from the given frame (e.g., different objects captured). An outlier weight may be computed to penalize frames that include sharp changes in photometric characteristics (e.g., brightness or color) relative to the other frames of the time-compressed video.

Some conventional techniques for removing or reducing drastic photometric changes in video are designed for real-time (as opposed to time-compressed) videos. However, such conventional techniques may be based on significant overlap of content between adjacent frames, e.g., because most of the frames are not removed as in time-compressed videos. These techniques may be unsuitable with time-compressed videos though, because the changes in content captured between frames of time-compressed videos can be much more significant than the changes in real-time videos, e.g., captured objects may not appear in adjacent frames of time-compressed videos or may appear in just a couple of adjacent frames. Additionally, some conventional techniques may involve significant user involvement to manually adjust colors on a frame-by-frame. Unlike conventional techniques, the described techniques are configured to stabilize photometric characteristics between frames even when there are significant content changes between the frames. Further, the described techniques automatically smooth the photometric characteristics over a time-compressed video without user input, other than to select to generate a time-compressed (e.g., timelapsed or hyperlapsed) video.

Term Descriptions

As used herein, the term "photometric characteristic" refers to a measurable quality of pixels that indicates a perceived brightness of light to the human eye. Examples of photometric characteristics include one or both of luminance and chrominance. In accordance with the techniques described herein, photometric characteristics of a frame's pixels can be described using color spaces, such as YCbCr color space.

A "color space" refers to an organization of colors that allows for reproducible representations of color, and may identify a particular combination of color model and a mapping function. A color model is an abstract mathematical model that describes the way colors can be represented as tuples of numbers (e.g., triples in red-green-blue (RGB)).

The described techniques are generally discussed with reference to "YCbCr," which refers to a family of color spaces used as a part of the color image pipeline in video and digital photography systems. Additionally, the term "Y" represents luminance, "Cb" represents a blue-difference chroma component, and "Cr" represents a red-difference chroma component.

The techniques described herein, relate generally to time-compressed video such as timelapsed and hyperlapsed videos. As used, herein "timelapse" and "hyperlapse" refer to techniques for compressing videos into shorter clips by time-compressing the original video. In particular, "timelapse" may refer to a technique in which videos captured using static (or slow-moving) cameras over an extended period of time are time-compressed (e.g., a day-to-night landscape compressed down to a minute of video). In contrast, "hyperlapse" may refer to a technique in which videos captured by moving (e.g., handheld) cameras over a long distance are time-compressed (e.g., a hike across the Great Wall compressed down to a minute of video).

As used herein, the term "uniform sampling" refers to a technique in which frames are selected from an original video uniformly. For example, every $x^{th}$ frame of the original video is selected (e.g., every $8^{th}$ frame), and used to generate a time-compressed video. In contrast, "feature sampling" refers to a technique in which frames are selected from an original video based on detection of features. For example, frames may be selected from an original video that include faces detected using one or more face detection techniques.

As used herein, the term "photometric stabilization" refers to the process of stabilizing photometric characteristics across a sequence of frames, such that there are not drastic differences in the photometric characteristics between the frames. In particular, photometric stabilization stabilizes photometric characteristic changes that are due to adjustments of video capturing devices rather than due to changes of content in a scene (e.g., a car driving through the scene).

As used herein, pixel "correspondences" refer to pixels in different video frames that are indicative of a same object—a same part of an object. For example, a pixel in one video frame that indicates a part of a picnic table is a correspondence with a pixel in another frame that indicates the same part of the picnic table—even if the corresponding pixel in the other frame is in a different location in the other frame. This shifting location may be due to movement of the camera and/or movement of objects through the scene.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
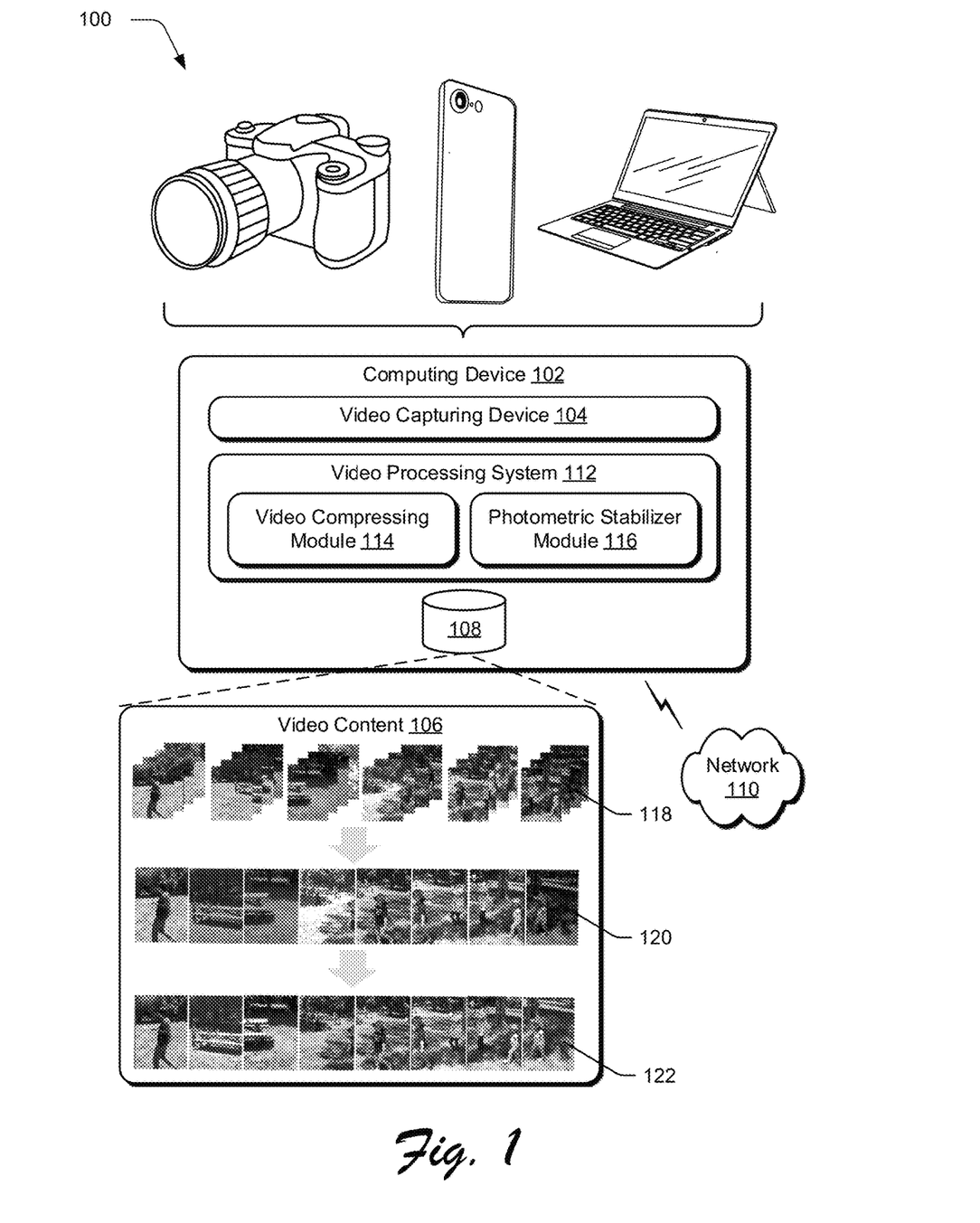
FIG. 1 is an illustration of an environment in an example implementation that is operable to employ techniques described herein.

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The computing device 102 is illustrated as including a video capturing device 104. The video capturing device 104 represents functionality of the computing device to capture digital video of a scene. In addition to capturing video, the video capturing device 104 may be capable of capturing digital still images, zooming in or out to capture video and still images, initiating a flash for capturing video and still images, and the like. The video capturing device 104 may also be capable of automatically adjusting imaging characteristics, such as white balance and exposure, to capture the objects in a scene under varying lighting conditions. In some implementations, the computing device 102 may be configured with multiple video capturing devices 104, such as when the computing device 102 is configured as a mobile phone, tablet device, or laptop, having both front- and rear-facing video capturing devices 104.

The digital video captured by the video capturing device 104 is represented by video content 106, which is illustrated as maintained in storage 108 of the computing device 102. Although the video content 106 represents video captured by the video capturing device 104, the video content 106 may also represent video obtained by the computing device 102 in other ways, e.g., communicated to the computing device 102 from another device over network 110. To this extent, the computing device 102 may not be configured with a video capturing device 104 in some implementations. In such implementations, the computing device 102 may represent functionality to perform the photometric stabilization described above and below for other devices, e.g., to offload some of the computing burden of doing so from those devices. As discussed in more detail below, the video content 106 also represents video processed according to the described techniques.

The computing device 102 is illustrated as including video processing system 112. The illustrated video processing system 112 is implemented at least partially in hardware of the computing device 102 to process and transform the video content 106. Such processing can include creating the video content 106 in connection with the video capturing device 104, and rendering the video content 106 in a user interface for output, e.g., by a display device of the computing device 102. Although illustrated as implemented locally at the computing device 102, functionality of the illustrated video processing system 112 may also be implemented in whole or part via functionality available via the network 110, such as part of a web service or "in the cloud."

Examples of functionality incorporated by the illustrated video processing system 112 to process and transform the video content 106 are illustrated as video compressing module 114 and photometric stabilizer module 116. The video compressing module 114 and photometric stabilizer module 116 are implemented at least partially in hardware of the computing device 102 (e.g., through use of a processing system and computer-readable storage media) to time-compress original video 118 to produce time-compressed video 120, and to stabilize photometric characteristics (e.g., one or both of luminance and chrominance) of the time-compressed video 120 to generate photometrically stabilized time-compressed video 122 (PS time-compressed video 122).

To produce the time-compressed video 120, the video compressing module 114 samples frames of the original video 118, e.g., by selecting every eighth frame of the original video 118, every eighth frame unless one of those frames is visually inconsistent with the other selected frames then instead selecting a nearby and visually consistent frame, one or two frames for each second of the original video 118, and so forth. The photometric stabilizer module 116 generates the PS time-compressed video 122 by filtering the time-compressed video 120 to preserve original scene illumination changes (e.g., changes of light when walking through a forest on a sunny day) but to remove high-frequency color fluctuations (e.g., fluctuations that may be introduced when the video capturing device 104 automatically adjusts white balance and exposure). As part of doing so, the photometric stabilizer module 116 determines pairwise transformations between adjacent frames of the time-compressed video 120 and computes a filter to smooth the transformations across the video. The photometric stabilizer module 116 may apply the computed filter to the time-compressed video 120 to generate the PS time-compressed video 122. Operation of the video compressing module 114 and the photometric stabilizer module 116 is described in greater detail in relation to FIG. 2 in the following description and as shown in corresponding video content frames of FIG. 3.

Video Time-Compressing and Photometric Stabilization

Figure 2:
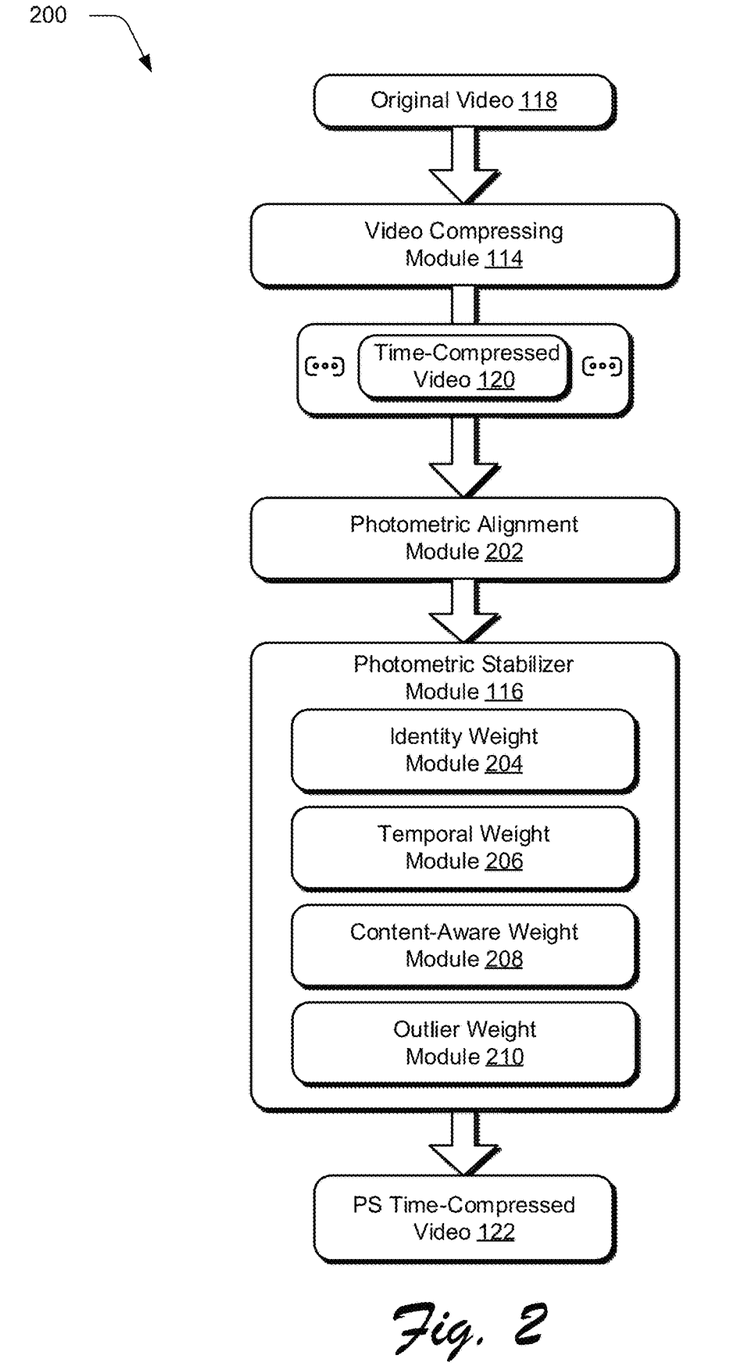
FIG. 2 depicts an example implementation in which a video processing system of FIG. 1 generates time-compressed video and stabilizes photometric characteristics of the time-compressed video.
Figure 3:
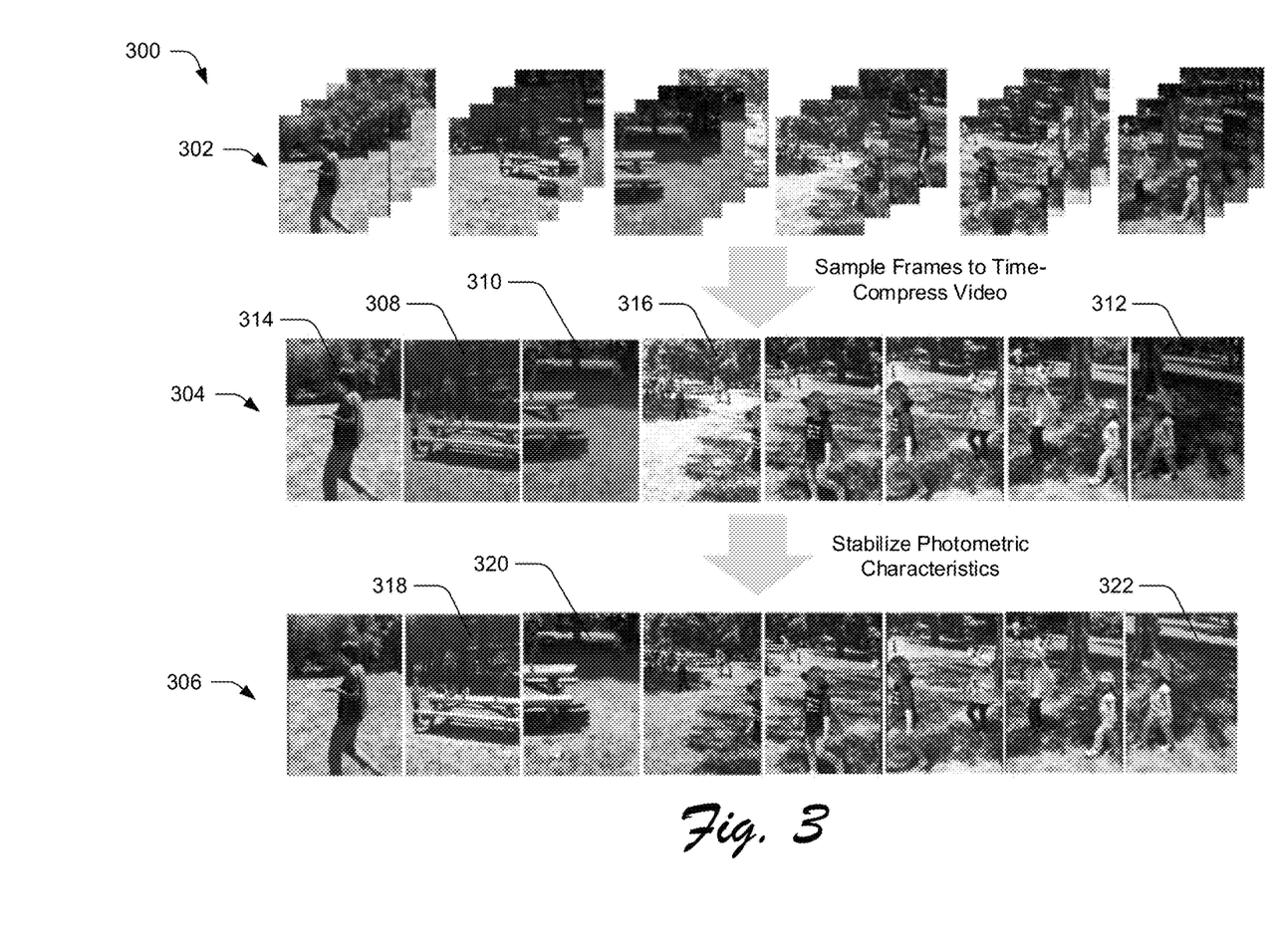
FIG. 3 depicts example frames of video content that is time-compressed using sampling and for which photometric characteristics are stabilized.

FIG. 2 depicts a system 200 in an example implementation in which operation of the video compressing module 114 and the photometric stabilizer module 116 is described in more detail as time-compressing original video and stabilizing photometric characteristics of the time-compressed video. FIG. 3 depicts an example 300 of frames of video content that is time-compressed using sampling and for which the photometric characteristics are stabilized.

The video compressing module 114 and the photometric stabilizer module 116 in this example are incorporated as part of a system to generate digital content comprising photometrically stabilized time-compressed video 122 (PS time-compressed video 122) from digital content comprising original video 118. To begin, the video compressing module 114 obtains the original video 118 to time-compress. The video compressing module 114 may obtain the original video 118, for instance, in response to a user selection to generate a timelapse video or a hyperlapse video. Regardless of the particular time-compressing technique used, the video compressing module 114 generates the time-compressed video 120 by sampling a subset of frames from the original video 118.

The video compressing module 114 represents functionality to sample frames of the original video 118 in a variety of different ways. For example, the video compressing module 114 may sample frames of the original video 118 by uniformly selecting every $x^{th}$ frame of video. The video compressing module 114 may also be capable of sampling frames of the original video 118 by detecting video features. In addition or alternately, the video compressing module 114 may sample frames of the original video 118 based on photometric characteristics, such as to select frames in a way that results in the selected frames having generally stable photometric characteristics or more stable photometric characteristics than if other frames are selected. This frame selection technique may be referred to herein as "photometrically stable frame sampling."

In one or more implementations, photometrically stable frame sampling involves the video compressing module 114 selecting frames of the original video 118 in a way that avoids degenerate frames, such as overexposed or underexposed frames. As part of selecting frames in a way that avoids degenerate frames, the video compressing module 114 computes a photometric cost, $C_p$, and blurriness cost, $C_b$, for selecting each of the frames. In general, the photometric cost $C_p$ is configured to associate a larger penalty with frames having larger color differences with neighboring frames than other frames. The photometric cost $C_p$ is also configured associate a larger penalty with frames having more lost information (e.g., that are highly saturated or darkened) than other frames. In one or more implementations, the video compressing module 114 computes the photometric cost $C_p$ according to the following equation:

$$C_p(i,j) = \frac{1}{N_{ij}} \|\overline{P}_i - \overline{P}_j\|$$

Here, i and j represent any two frames of the original video 118 (e.g., adjacent frames). Further, the terms $\overline{P}_i$ and $\overline{P}_j$ represent the mean correspondence value in frames i and j, in the YCbCr color space. In general, the YCbCr color space corresponds to a family of color spaces used as a part of the color image pipeline in video and digital photography systems, where the term Y represents a luminance component and Cb and Cr are blue-difference and red-difference chroma components. In this equation, the term $N_{ij}$ represents the number of correspondences in the frame pair (i,j). The video compressing module 114 may compute the photometric cost, which penalizes frames having large color differences with neighboring frames and having lost information, using different equations without departing from the spirit or scope of the techniques described herein.

As mentioned above, the video compressing module 114 may also compute the blurriness cost $C_b$ as part of photometrically stable frame sampling. In general, the blurriness cost $C_b$ is configured to associate a larger penalty with frames having more motion blur than other frames—motion blur may be due to camera motion or dynamic objects in a scene (e.g., a car driving through the scene). To compute the blurriness cost $C_b$, the video compressing module 114 quantifies a blurriness of each frame. For instance, the video compressing module 114 may quantify a blurriness of each frame by applying a Laplacian kernel to feature patches of each frame and computing a summed variance within the patches as determined through application of the Laplacian kernel. The video compressing module 114 may also be configured to compute a blurriness cost for the frames in a variety of other ways without departing from the spirit or scope of the techniques described herein.

Regardless of the particular manner in which the video compressing module 114 computes the photometric and blurriness costs, these costs may be added together for sampling frames from the original video 118, such that the combination of frames selected for the time-compressed video 120 has the lowest cost. These costs may also be added to other costs in accordance with one or more implementations, such as costs that penalize larger movement of objects more than smaller movements of objects. In any case, the video compressing module 114 samples the frames of the original video 118 to select a subset of its frames to produce the time-compressed video 120. Accordingly, the time-compressed video 120 represents a selected subset of frames from the original video 118. Once the time-compressed video 120 is generated, the described system photometrically stabilizes the time-compressed video 120 to produce the PS time-compressed video 122.

The illustrated system 200 also includes photometric alignment module 202, which represents functionality to determine how photometric characteristics (e.g., one or both of luminance and chrominance) change between adjacent frames. In particular, the photometric alignment module 202 computes photometric transformations between adjacent frames, which represent how the photometric characteristics change between the adjacent frames.

As part of computing these transformations, the photometric alignment module 202 determines objects of the scene that are captured in the each of the frames, e.g., by extracting local image features. The photometric alignment module 202 may then determine how the determined objects move between the frames, e.g., by computing a homography transformation that enables the frame pair to be aligned. This may be based, at least in part, on locations and sizes of the objects in the frames. With the pair of frames aligned, the photometric alignment module 202 may sample corresponding pixel values from the frames. By way of example, the photometric alignment module 202 may randomly sample a subset (e.g., 5%) of the corresponding pixels for photometric characteristic values (e.g., one or both of luminance and chrominance). The photometric alignment module 202 may compute the photometric transformation between the adjacent frames based on differences between the photometric characteristic values of the sampled corresponding pixels. In particular, the photometric alignment module 202 may compute a pairwise photometric transformation by minimizing this transformation function:

$$\sum_{(p_i,q_i)\in P_i} \|T_{i,i+1}(\theta)p_i - q_i\| + \lambda\|T_{i,i+1}(\theta) - II\|$$

Here, i and i+1 represent adjacent frames, $P_i$ represents the set of corresponding pixels selected for sampling, $(p_i,q_i)$ represent a pair of the values for corresponding pixels of two frames. For instance, $p_i$ represents photometric characteristic values for the pixels of frame i having corresponding pixels in frame i+1 and that are sampled. Accordingly, $q_i$ represents photometric characteristic values for the pixels of frame i+1 having corresponding pixels in frame i and that are sampled. The term $\lambda$ represents a weight for regularization, and the term $\Pi$ represents an identity transformation.

Luminance and chrominance are discussed above as examples of photometric characteristic values that can be used individually or together for computing photometric transformations between adjacent frames. However, the described techniques are not limited solely to color spaces that express how colors are represented according to those characteristics, e.g., the YCbCr color space. Other color spaces, such as the red green blue (RGB) color space, may be used also or instead to determine photometric characteristic values. In addition to being capable of using any of a variety of different color spaces, the photometric alignment module 202 can also be configured to use any of a variety of different transformation models—for minimizing the transformation function—without departing from the spirit or scope of the techniques described herein.

In implementations that involve the YCbCr color space, the photometric alignment module 202 is configured to model color transfer between adjacent frames as a global transfer. Modeling the color transfer as a global transfer enables the photometric alignment module 202 to determine when changes in the time-compressed video are due to automatic adjustments made by the video capturing device 104 or global scene illumination changes.

Once the photometric alignment module 202 computes the pairwise transformations between each adjacent frame of the time-compressed video 120 (e.g., $T_{1,2}$ (transformation between frame 1 and frame 2), $T_{2,3}$, . . . , $T_{N-1,N}$), the photometric alignment module 202 can compute the transformation between an arbitrary pair of the time-compressed video 120's frames (e.g., between frame i and frame j). The photometric alignment module 202 can compute the transformation between the arbitrary pair of frames i and j by accumulating the transformations between those frames. In one or more implementations, the photometric alignment module 202 computes the transformation $T_{i,j}$ by accumulating the transformations between frames i and j as follows:

$$T_{i,j}=T_{j-1,j} \ldots T_{i+1,i+2}T_{i,i+1}$$

In addition to accumulating transformations in this way, the photometric alignment module 202 may accumulate correspondences from neighboring frames to alleviate model bias that may introduce artefacts into the frames. For example, the photometric alignment module 202 uses the above described pixel samples $(p_i,q_i)$ from a window of neighboring frames. The photometric alignment module 202 may compute the pairwise transformations between adjacent frames and between arbitrary frames of the time-compressed video 120 in other ways without departing from the spirit or scope of the technique described herein.

The photometric alignment module 202 can then supply the computed pairwise transformations between the time-compressed video 120's adjacent frames to the photometric stabilizer module 116. With the pairwise transformations, the photometric stabilizer module 116 computes filters for generating smooth transformations between the adjacent frames of the time-compressed video 120. These smooth transformations are applied as part of generating the PS time-compressed video 122. In computing the filters, the photometric stabilizer module 116 analyzes the actual content (e.g., the objects of the scene) captured in the frames of the time-compressed video 120. The photometric stabilizer module 116 does this to distinguish between variations in pixel colors that are to be kept and variations in pixel color that are to be removed, such that they are not visible in or at least reduced in the PS time-compressed video 122. Examples of variations in pixel colors that are to be kept include variations that result from real changes in content of the scene (e.g., a car drives into the scene captured). In contrast, examples of variations in pixel colors that are to be removed include variations that correspond to high-frequency jitter in camera white balance, jitter in camera exposure, and so on.

To distinguish between the variations that are to be kept and the variations that are to be removed, the photometric stabilizer module 116 determines a measure of photometric similarity between pairs of frames of the time-compressed video 120. The determined measure may compare color distributions of each pair of frames, such as by using Earth Mover's Distance (EMD), standard Kullback-Leibler (KL)-divergence, and so forth. It should be appreciated that other techniques may also be used to determine photometric similarity between frames of the time-compressed video 120. Although such other techniques may be used, the following discussion describes using EMD to determine the measure of photometric similarity between the pairs of frames. The photometric similarity between frames i and j may be described according to a computed distance $\mathbb{D}_{i,j}$, such that smaller values of the distance $\mathbb{D}_{i,j}$ represent a greater photometric similarity between the frames than larger values. In one or more implementations, the photometric stabilizer module 116 computes the distance $\mathbb{D}_{i,j}$ according to the following equation:

$$\mathbb{D}_{i,j}=\text{EMD}(\text{pdf}(p_i),\text{pdf}(q_j))$$

In this equation, EMD ( ) represents use of the Earth Mover's Distance. Further, $\text{pdf}(p_i)$ and $\text{pdf}(q_j)$ represent a histogram of corresponding pixel values in the frame i and j, respectively. Accordingly, given two frames of the time-compressed video, the photometric alignment module 202 can compute a photometric transformation that aligns the two frames, and the photometric stabilizer module 116 can then compute a photometric similarity measure between the two frames. This enables the photometric stabilizer module 116 to remove or reduce differences in the frames that are caused by camera adjustments, and then to measure differences in the actual content of the scene.

Based on the photometric similarity measure, the photometric stabilizer module 116 is configured to compute the filters for generating smooth transformations. These filters may also be weighted as described in the following discussion, and thus referred to herein as "weighted smoothing filters." To compute the weighted smoothing filters, the photometric stabilizer module 116 may utilize functionality represented by the illustrated identity weight module 204, temporal weight module 206, content-aware weight module 208, and outlier weight module 210. Each of these modules represents functionality to compute a different weight, which the photometric stabilizer module 116 combines in connection with computing the weighted smoothing filters.

In general, the photometric stabilizer module 116 computes a weighted smoothing filter for each frame of the time-compressed video 120. The weighted smoothing filter is computed based on photometric characteristics of frames neighboring a given frame. In one or more implementations, the photometric stabilizer module 116 computes a weighted filter $W_i$ of size M for each frame i, where M corresponds to a number of neighboring frames from which the photometric characteristics are used to compute the filter. Accordingly, the neighboring frames of frame i include the frames from i−(M/2) to i+(M/2). The photometric stabilizer module 116 may compute an overall weight W by combining the weights computed by the identity weight module 204, the temporal weight module 206, the content-aware weight module 208, and the outlier weight module 210. The identity weight module 204 is configured to compute an identity weight $W_I$, the temporal weight module 206 is configured to compute a temporal weight $W_T$, the content-aware weight module 208 is configured to compute a content weight $W_C$, and the outlier weight module 210 is configured to compute an outlier weight $W_M$. Additionally, the photometric stabilizer module 116 may compute the overall weight W by combining these weights as a normalized sum as follows:

$$W_{(i,j)} = \frac{1}{N_I}W_I(i,j) + \frac{1}{N_T}W_T(i,j) + \frac{1}{N_C}W_C(i,j) + \frac{1}{N_M}W_M(i,j)$$

Here, the term i represents a given frame for which a filter is being computed and the term j represents one of the neighboring frames. The terms $N_I$, $N_T$, $N_C$, and $N_M$ represent normalization factors computed by the photometric stabilizer module 116 and enable the different weights to be normalized. Although combined in the equation above using a linear function, the weights may be combined in other ways without departing from the spirit or scope of the described techniques, such as according to a non-linear function As noted above, an identity weight may be computed in accordance with one or more implementations. In general, the identity weight is configured to penalize neighboring frames that have different photometric characteristic values from the given frame i. Consider an example in which the identity weight module 204 is configured to compute the identity weight $W_I$ according to the following:

$$W_I(i,j) = \exp^{-\mathbb{D}_{i,i'}}$$

Here, $W_I(i,j)$ indicates that the identity weight is computed for the given frame i relative to one of the neighboring frames, which is represented as j. Further, the term i' represents a simplified notation of transformed pixel samples of the frame i that are transformed by applying the transform $T_{i,j}$ (e.g., $T_{i,j}(p_i)$), which is determined between the frame i and j. In scenarios where the color of frame j is similar to the color of frame i, the transform determined between frames i and j approaches identity. In other words, the transformation may be applied to $p_i$ to produce photometric values that are similar to $p_j$. The term $\mathbb{D}_{i,i'}$ represents a computed EMD distance between histograms of corresponding pixel values between i and i'. When this distance is smaller, it represents that the neighboring frames are more similar to the given frame i than a larger distance. Consequently, this weight can be used to evaluate an amount of similarity with the given frame—which can result in a close to identity transformation if the neighboring frames are similar.

A temporal weight may also be computed in accordance with one or more implementations. Broadly speaking, the temporal weight is configured to penalize frames that are temporally further from a given frame more than frames that are temporally closer. For instance, the temporal weight penalizes frame i−2 more than frame i−1. Consider an example in which the temporal weight module 206 is configured to compute the temporal weight $W_T$ according to the following:

$$W_T(i,j) = \exp^{-((i-j)^2/(2\sigma^2))}$$

Here, $W_T(i,j)$ indicates that the temporal weight is computed for the given frame i relative to one of the neighboring frames, which is represented as j. Further, σ represents the standard deviation of the photometric values of frame i and frame j.

A content-aware weight may also be computed in accordance with one or more implementations. In general, the content-aware weight is configured to average transformations across frames that are similar in content, e.g., show similar objects of a scene between frames. For instance, if a first, second, and third frame include more similar content than a fourth, fifth, and sixth frame, then the content aware weight is configured average the transformations between the first, second, and third frames more than the transformations between the fourth, fifth, and sixth frames, such that the transformation of the first frame has a greater influence on the transformation of the third frame than the transformation of the fourth frame has on the transformation of the sixth frame. Consider an example in which the content-aware weight module 208 is configured to compute the content weight $W_C$ according to the following:

$$W_C(i,j) = \exp^{-\mathbb{D}_{i',j}}$$

Here, $W_C(i,j)$ indicates that the content-aware weight is computed for the given frame i relative to one of the neighboring frames, which is represented as j. Again, the term i' represents a simplified notation of transformed pixel samples of the frame i that are transformed by applying the transform $T_{i,j}$ (e.g., $T_{i,j}(p_i)$), which is determined between the frame i and j. The term $\mathbb{D}_{i',j}$ represents a computed EMD distance between histograms of corresponding pixel values between i' and j. Differences between a transformed distribution of a given frame and a transformed distribution of another frame, as indicated by the content-aware weight, correspond to a content change between the frame pair (e.g., different objects in a scene or objects moving through the scene). In contrast, a simple camera adjustment (e.g., due to exposure or white balance) may be equalized by the transformation $T_{i,j}$. This leads to a greater similarity in content between the frames and a larger content-aware filter weight $W_C(i,j)$.

In addition, an outlier weight may be computed in accordance with one or more implementations. As used herein, an "outlier" frame refers to a frame that includes a significant difference in one or more visual characteristics (e.g., brightness or color) from other frames of the time-compressed video 120. The outlier weight is configured to weight frames determined to be outliers less than non-outlier frames during computation of reference distribution. This outlier weight is also configured to account for the observation that an outlier frame may significantly influence the identity weight, the temporal weight, and the content-aware weight of an outlier frame's neighbors, such that lower values are computed for the weights of the neighboring frames than if the outlier frame were removed. Accordingly, the photometric stabilizer module 116 may use the outlier weight to remove the outlier frames from determining the weights of the other frames of the time-compressed video 120. Consider an example in which the outlier weight module 210 is configured to compute the outlier weight $W_M$ according to a majority voting approach, such as median filtering. In this example, the outlier weight module 210 may compute the outlier weight according to the following:

$$W_M(i,j) = \exp^{-\|\mathbb{D}_{i,med} - \mathbb{D}_{i,j}\|}$$

Here, $W_M(i,j)$ indicates that the outlier weight is computed for the given frame i relative to one of the neighboring frames, which is represented as j. Further, the term $\mathbb{D}_{i,med}$ represents the EMD distance between a distribution of pixel values of frame i and a distribution of median pixel values within frame i's neighboring range, e.g., i−(M/2) to i+(M/2). Further still, the term $\mathbb{D}_{i,j}$ represents the EMD distance between a distribution of pixel values of frame i and frame j.

Although the photometric stabilizer module 116 is illustrated with the identity weight module 204, the temporal weight module 206, the content-aware weight module 208, and the outlier weight module 210, the photometric stabilizer module 116 may be configured with different modules to compute different weights used for stabilizing photometric characteristics of the time-compressed video 120 without departing from the spirit or scope of the techniques described herein.

In addition to computing weights, the photometric stabilizer module 116 also represents functionality to use the computed weights to smooth the variations in photometric characteristics between the frames of the time-compressed video 120. In one or more implementations, the photometric stabilizer module 116 uses the weights to compute smoothly varying transformations between the frames. Consider an example in which the photometric stabilizer module 116 computes smoothly varying transformations $\hat{T}_i$ by directly applying the combined weighted filters to the computed photometric transformations (e.g., $T_{i,j}$) as follows:

$$\hat{T}_i = \sum_{j=i-M/2}^{j=i+M/2} W(i,j) T_{i,j}$$

In this equation, the terms j=i−M/2 and j=i−M/2 represent that the smoothly varying transformations are computed for each of the transforms determined between the frames in the neighborhood, as defined above, of frame i.

By merely smoothing the transformations between the frames using the computed smoothly varying transformations, artefacts may remain or be produced in the frames. In one or more implementations, additional weighted filters may thus also be applied to remove the artefacts that result from applying the smoothly varying transformations. To remove such artefacts, the photometric stabilizer module 116 may apply the combined weighted filters to values of pixels that have been transformed by the smoothly varying transformations. The photometric stabilizer module 116 may further compute an additional transformation from the filtered pixel values. To apply the combined weighted filters and compute the additional transformation, the photometric stabilizer module 116 is configured to initially extract the correspondence points $p_i$ of the given frame i. The photometric stabilizer module 116 is further configured to transform the distribution of these points to match the distributions of each of frame i's neighbor frames. Additionally, the photometric stabilizer module 116 is configured to apply the weighted filter to determine a color distribution. In one or more implementations, the photometric stabilizer module 116 computes color distribution $\hat{p}_i$ according to the following:

$$\hat{p}_i = \sum_{j=i-M/2}^{j=i+M/2} W(i,j)(T_{i,j} p_i)$$

The computed color distribution is indicative of weighted color values, which represent smoothly varying pixel values. Once the weighted color values are computed, the photometric stabilizer module 116 may compute a per-pixel transformation that aligns original pixel $p_i$ values with the weighted color values. The photometric stabilizer module 116 may compute the per-pixel transformation according to the following:

$$\arg\min_{\theta} \|\hat{T}(\theta)_{i,i+1} P_i - \hat{P}_i\|$$

Here, the term $\hat{P}_i$ represents the color distribution, which may be computed in the manner described just above. The term $\hat{T}(\theta)$ represents a transformation that the photometric stabilizer module 116 can apply to the entire frame i to obtain i'=$\hat{T}(\theta)$i, where i' is the photometrically stabilized frame i.

The photometric stabilizer module 116 may compute transformations for each frame of the time-compressed video 120 in this way. The photometric stabilizer module 116 may generate the PS time-compressed video 122 by applying the computed transformations to the time-compressed video 120. In particular, this may include adjusting pixel values of the frames of the time-compressed video 120 by a determined amount, and generating the PS time-compressed video 122 so that the frames of the PS time-compressed video 122 have pixels adjusted by the determined amount.

FIG. 3 illustrates an example 300 of frames of video content that is time-compressed using sampling and for which the photometric characteristics are stabilized. In particular, the illustrated example includes a first row of frames 302, a second row of frames 304, and a third row of frames 306. The first row of frames 302 represents frames of the original video 118, e.g., each frame of the original video 118. The second row of frames 304 represents frames of the time-compressed video 120, e.g., each frame of the time-compressed video 120. Lastly, the third row of frames 306 represents frames of the PS time-compressed video 122.

In accordance with the above described techniques, the video compressing module 114 may obtain the original video 118 corresponding to the first row of frames 302. The video compressing module 114 may time-compress the original video 118 by sampling the frames of the first row 302, such as by using uniform sampling (e.g., every $x^{th}$ frame), feature sampling (e.g., frames determined to include faces), or photometrically stable frame sampling. The frames of the second row 304 represent the subset of frames selected from the first row of frames 302 via the sampling. The sequence of frames of the second row, together, form the time-compressed video 120.

In the illustrated example, however, the frames of the second row 304 are photometrically varied in a manner that, if played back, may be distracting or visually unpleasant to a viewer. For example, frames 308, 310, and 312 are darker than the other frames of the second row 304. As such, these frames may cause flickering in the time-compressed video 120. To reduce or remove the photometric variations that cause such flickering, the frames are photometrically stabilized, e.g., the photometric characteristics of the frames are stabilized.

In accordance with the described techniques, the photometric alignment module 202 receives the time-compressed video 120 corresponding to the second row of frames 304.

The photometric alignment module 202 may compute how photometric characteristics change between the frames of the second row 304, such as how the photometric characteristics change between frame 314 and frame 308, between frame 308 and frame 310, between frame 310 and frame 316, and so forth. In particular, the photometric alignment module 202 computes photometric transformations between the frames that are indicative of the photometric characteristic changes.

The photometric stabilizer module 116 then uses these photometric transformations to compute filters for stabilizing the photometric characteristics across the frames, as described in more detail above. The photometric stabilizer module 116 can then apply the filters to frames of the second row 304 to generate the frames of the third row 306. By way of example, the photometric stabilizer module 116 may compute a filter for frame 308 that is effective to lighten that frame (e.g., because it is determined to be darker than the other frames as a result of camera adjustments). Similarly, the photometric stabilizer module 116 may compute filters for frames 310, 312 that are effective to lighten those frames (e.g., because they are also determined to be darker than the other frames as a result of camera adjustments). The photometric stabilizer module 116 may then apply the computed filters to the frames 308, 310, 312 to generate frames 318, 320, 322, which are adjusted to be lighter than the corresponding frames of the second row. Although not specifically discussed, the photometric stabilizer module 116 also computes filters for the other frames of the second row 304 and applies those filters to produce the other frames of the third row 306.

Having discussed example details of the techniques for photometric stabilization for time-compressed video, consider now some example procedures to illustrate additional aspects of the techniques.

Example Procedures

This section describes example procedures for photometric stabilization for time-compressed video in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 having a video processing system 112 that makes use of a video compressing module 114 and a photometric stabilizer module 116 or one implemented as the example system 200 of FIG. 2, which also make use of those modules.

Figure 4:
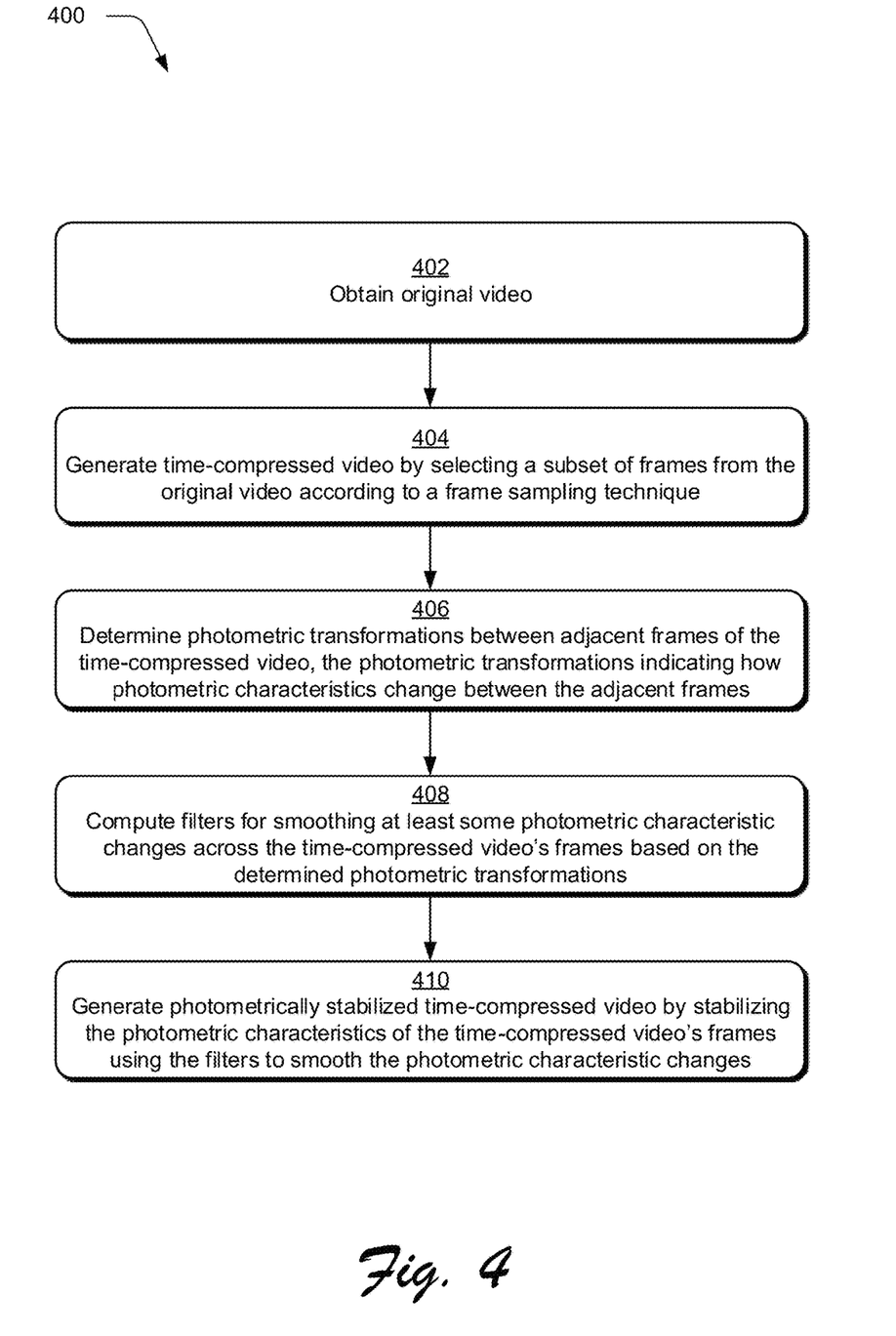
FIG. 4 depicts a procedure in an example implementation in which video content is time-compressed and photometric characteristics of the time-compressed video are stabilized.

FIG. 4 depicts an example procedure 400 in which video content is time-compressed and photometric characteristics of the time-compressed video are stabilized. Original video content is obtained (block 402). By way of example, the video compressing module 114 obtains the original video 118 as it is being captured by the video capturing device 104. In this way the compressing and photometric characteristic stabilization described above and below may be performed in substantially real-time. By "substantially real-time" it is meant that there is at least some delay between a time when imaging sensors of the video capturing device 104 capture video of a scene and a time when the photometrically-stabilized time-compressed video can be viewed via a display device. In another example, the video compressing module 114 may obtain the original video 118 from the video content 106 maintained in the storage 108 or from another source over the network 110.

Once the original video is obtained, time-compressed video is generated by selecting a subset of frames from the original video according to a frame sampling technique (block 404). By way of example, the video compressing module 114 selects the frames of the second row 304 from the frames of the first row 302, which correspond to the frames of the original video 118. The video compressing module 114 selects these frames based on one or more frame sampling techniques, such as a uniform sampling technique in which every $x^{th}$ frame of the original video is selected, a feature sampling technique, or a photometrically stable frame sampling technique, as described in more detail above.

Photometric transformations are determined between adjacent frames of the time-compressed video (block 406). In accordance with the principles discussed herein, the photometric transformations indicate how photometric characteristics change between the adjacent frames. By way of example, the photometric alignment module 202 determines photometric transformations between adjacent frames of the second row of frames 304, such as a photometric transformation between frames 314, 308, a photometric transformation between frames 308, 310, a photometric transformation between frames 310, 316, and so on. These photometric transformations indicate how photometric characteristics of the frames' pixels (e.g., one or both of luminance and chrominance) change between adjacent frames. With reference to the frames 314, 318, the determined photometric transformation indicates how the photometric characteristics change between frame 314 and frame 318.

In one or more implementations, the photometric transformations determined between the adjacent frames at block 406 are also used to compute photometric transformations between non-adjacent frames. By way of example, the determined photometric transformation between frames 314, 308 and the determined photometric transformation between frame 308, 310 are combined to determine a photometric transformation between frames 314, 310. Additionally, photometric transformation data (not shown) indicative of the determined photometric transformations (at block 406 and by combining these transformations) can be saved, at least temporarily, in storage of the computing device 102.

Filters are computed for smoothing at least some photometric characteristic changes across the time-compressed video's frames (block 408). In accordance with the principles discussed herein, the filters are computed based on the determined photometric transformations. As described in more detail in relation to FIG. 5, the filters are also computed based on measures of photometric similarity computed between the frames of the time compressed video. By way of example, the photometric stabilizer module 116 computes filters for smoothing at least some photometric characteristic changes across the frames of the second row of frames 304. In particular, the photometric stabilizer module 116 computes the filters based on the photometric transformations determined at block 406. The photometric stabilizer module 116 may compute these filters according to a weighting technique as described in more detail above and below.

Photometrically stabilized time-compressed video is generated by stabilizing the photometric characteristics of the frames of the time-compressed video (block 410). In accordance with the principles discussed herein, the photometric characteristics are stabilized using the computed filters to smooth the photometric characteristic changes across the frames of the time-compressed video. By way of example, the photometric stabilizer module 116 generates the photometrically stabilized time-compressed video 122 (PS time-compressed video 122), which corresponds to the sequence of frames of the third row 306, by stabilizing photometric characteristics of the frames of the second row 304. To stabilize these photometric characteristics, the photometric stabilizer module 116 uses the filters computed at block 406 to smooth the photometric characteristic changes across the frames of the second row 304.

Figure 5:
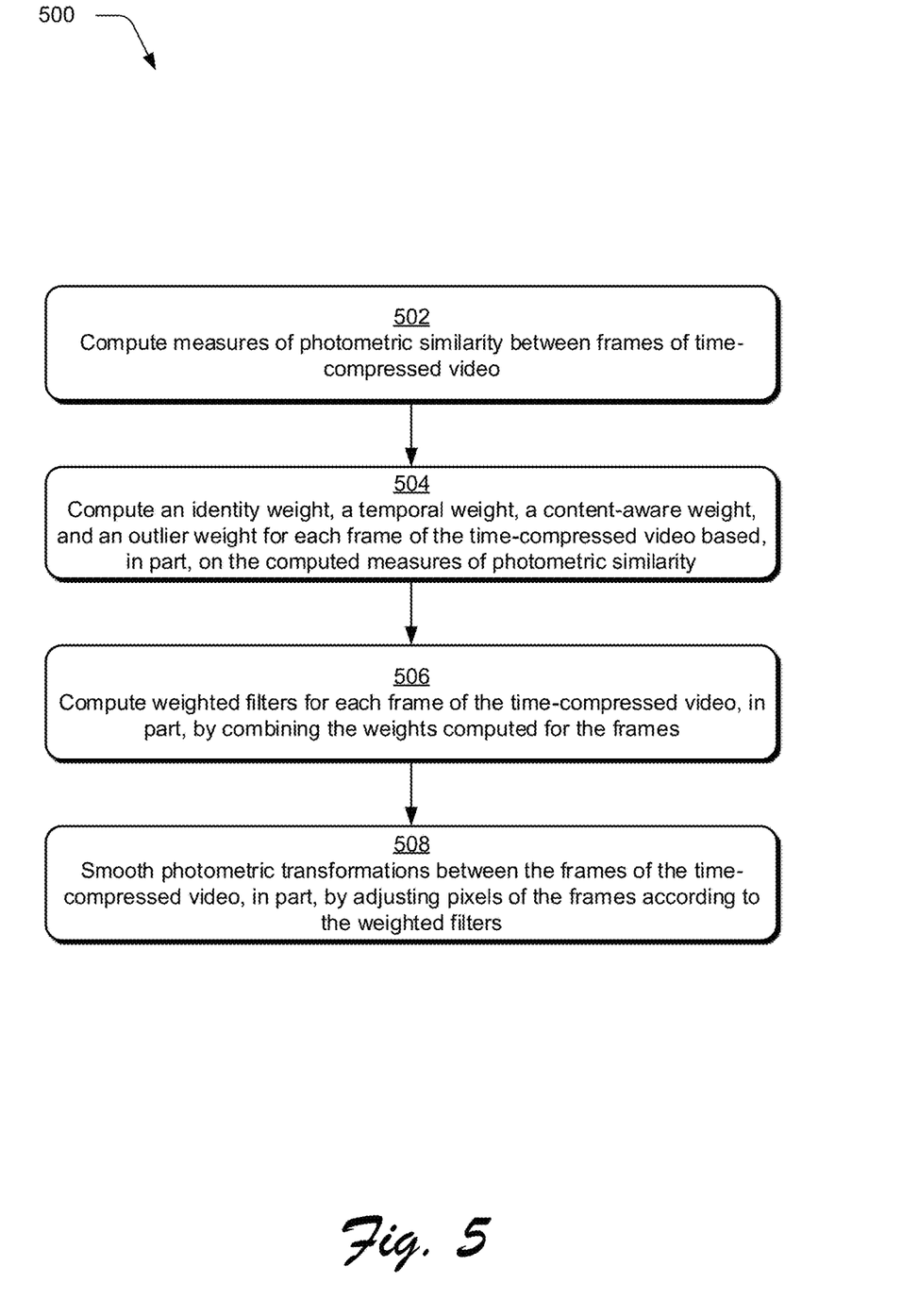
FIG. 5 depicts a procedure in an example implementation in which filters are computed for smoothing photometric characteristics across frames of a time-compressed video.

FIG. 5 depicts an example procedure 500 in in which filters are computed for smoothing photometric characteristics across frames of a time-compressed video. Measures of photometric similarity are computed between frames of time-compressed video (block 502). In accordance with the principles discussed herein, the measure of photometric similarity indicates how similar photometric characteristics are for corresponding pixels of a pair of frames. By way of example, the photometric stabilizer module 116 computes measures of similarity between each frame of the time-compressed video 120 depicted in the second row of frames 304. For instance, photometric stabilizer module 116 computes a measure of photometric similarity between frames 314, 308, between frames 314, 310, between frames 314, 316, and so on. These measures of photometric similarity indicate how similar photometric characteristics are for corresponding pixels of the frames of the second row 305. For example, corresponding pixels of frames 308, 310 may include at least some pixels that make up the picnic table depicted in those frames. Accordingly, the measure of photometric similarity indicates how similar photometric characteristics are for the pixels of frames 308, 310 that make up the picnic table. In one or more implementations, the photometric stabilizer module 116 computes the measures of similarity using the Wasserstein metric, specifically Earth Mover's Distance (EMD).

An identity weight, temporal weight, content-aware weight, and an outlier weight are computed for each frame of the time-compressed video based, in part, on the computed measures of photometric similarity (block 504). By way of example, the identity weight module 204 computes an identity weight for each frame of the time-compressed video 120, the temporal weight module 206 computes a temporal weight for each frame of the time-compressed video 120, the content-aware weight module 208 computes a content-aware weight for each frame of the time-compressed video 120, and outlier weight module 210 computes an outlier weight for each frame of the time-compressed video 120.

In general, the identity weight penalizes neighboring frames of a given frame that have different photometric characteristics, as determined by the measures of photometric similarity. The temporal weight penalizes frames more that are temporally further from a given frame. The content-aware weight penalizes frames having similar content to a given frame (e.g., similar objects captured), but different photometric characteristics. However, the content-aware weight does not penalize (or does so to a lesser degree) frames that have different photometric characteristics but also have different content to the given frame (e.g., different objects captured). The outlier weight penalizes frames that include sharp changes in photometric characteristics (e.g., brightness or color) relative to the other frames of the time-compressed video 120. Examples of how these weights may be specifically computed based on the measures of similarity are described in more detail above.

Weighted filters are computed for each frame of the time-compressed video, in part, by combining the weights computed for the frames (block 506). By way of example, the photometric stabilizer module 116 computes weighted filters for each frame of the time-compressed video 120 by combining the weights computed at block 504. In particular, the photometric stabilizer module 116 combines the identity weight computed by the identity weight module 204, the temporal weight computed by the temporal weight module 206, the content-aware weight computed by the content aware weight module 208, and the outlier weight computed by the outlier weight module 210. In one or more implementations, the photometric stabilizer module 116 normalizes the weights and sums the weights to produce an overall weighted filter for each frame.

Photometric transformations between the frames of the time-compressed video are smoothed, in part, by adjusting pixels of the frames according to the weighted filters (block 508). By way of example, the photometric stabilizer module 116 smooths the photometric transformations between the frames of the second row 304 by adjusting pixels of those frames according to the weighted filters computed at block 506. The photometric stabilizer module 116 generates digital content comprising the frames of the third row 306 so that pixels of those frames have the adjusted values. In this example, the PS time-compressed video 122 corresponds to the sequence of frames of the third row 306.

Having described example procedures in accordance with one or more implementations, consider now an example system and device that can be utilized to implement the various techniques described herein.

Example System and Device

Figure 6:
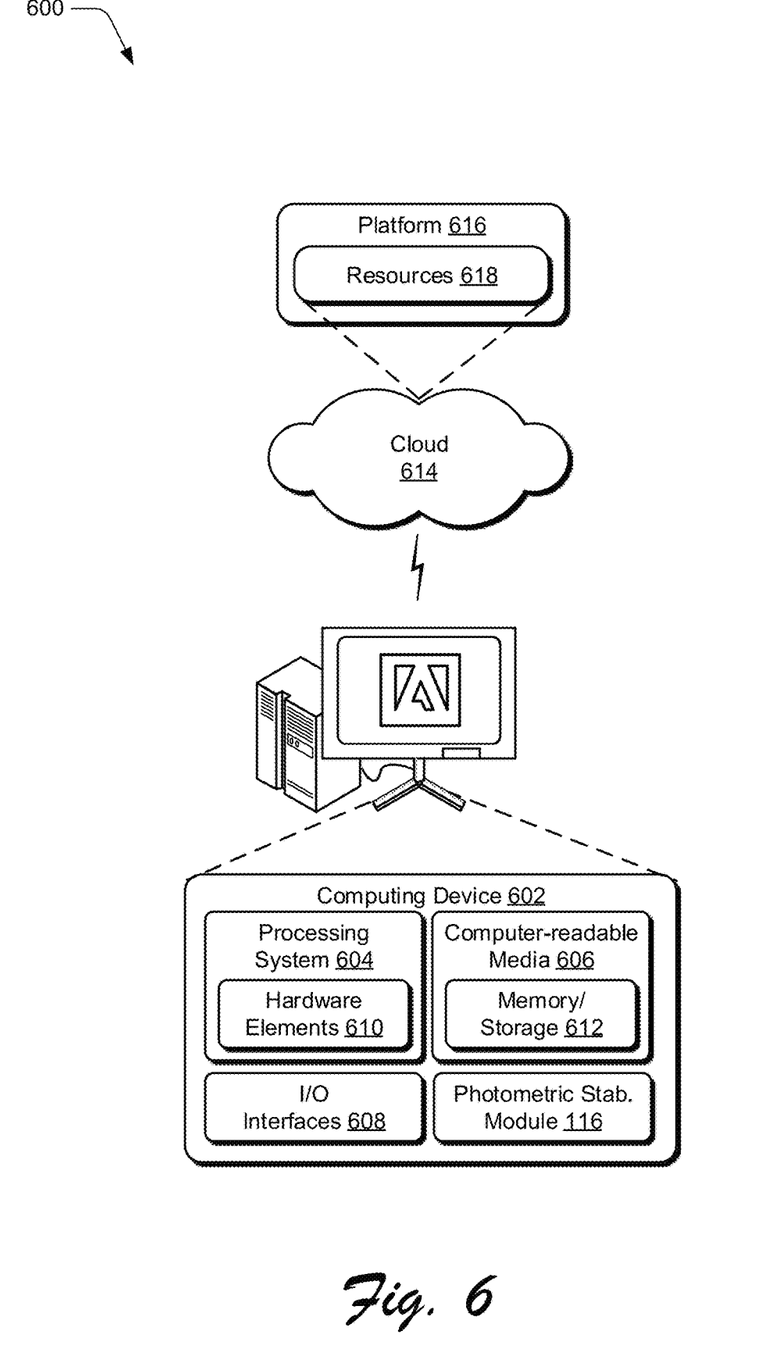
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the photometric stabilizer module 116. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch) such as video capturing device 104, and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to reduce at least some photometric characteristic changes of time-compressed video, a method implemented by a computing device, the method comprising:
   determining, by the computing device, correspondences of pixels in adjacent frames of a time-compressed video;
   determining, by the computing device, photometric transformations between the adjacent frames of the time-compressed video, the photometric transformations describing how photometric characteristics of the correspondences change between the adjacent frames;
   computing, by the computing device, a measure of photometric similarity between the adjacent frames based on the photometric characteristics of the correspondences;
   computing, by the computing device, filters for smoothing photometric characteristic changes across the time-compressed video as combinations of the determined photometric transformations by combining the determined photometric transformations according to weights indicating that photometric transformations between similar frames of the time-compressed video, as indicated by the measure of photometric similarity, influence the filters more than the photometric transformations between less similar frames; and
   generating, by the computing device, digital content comprising photometrically stabilized time-compressed video, in part, by using the computed filters to smooth the photometric characteristic changes.

2. A method as described in claim 1, wherein computing the filters includes:
   computing a content-aware weight that indicates whether the photometric characteristic changes are due to objects captured in a scene of the time-compressed video changing or due to adjustments made by a video capturing device that captures the scene; and
   computing the filters to smooth at least one of the photometric characteristic changes due to the adjustments made by the video capturing device.

3. A method as described in claim 2, further comprising computing the filters to keep from smoothing at least one of the photometric characteristic changes due to the objects captured in the scene changing.

4. A method as described in claim 1, further comprising generating the time-compressed video by selecting a subset of frames from an original video according to a frame sampling technique.

5. A method as described in claim 4, wherein the frame sampling technique uniformly selects the subset of frames from the original video for inclusion in the time-compressed video.

6. A method as described in claim 4, wherein the frame sampling technique comprises:
   determining additional correspondences of pixels in frames of the original video;
   determining differences in color of the additional correspondences in the frames of the original video;
   determining a blurriness of each frame of the original video; and
   selecting the subset of frames for inclusion in the time-compressed video based on the determined differences in color and the determined blurriness.

7. A method as described in claim 4, further comprising:
   obtaining the original video from storage of the computing device;
   obtaining the original video from a video capturing device as the video capturing device captures the original video; or
   obtaining the original video over a network.

8. A method as described in claim 1, wherein determining the photometric transformations between the adjacent frames of the time-compressed video comprises:
   determining how to align the adjacent frames based, at least in part, on locations of the correspondences in the adjacent frames;
   determining differences in the photometric characteristics of at least a subset of the correspondences in the adjacent frames; and
   computing the photometric transformations based on the determination regarding how to align the adjacent frames and the determined differences in the photometric characteristics.

9. A method as described in claim 1, wherein using the computed filters to smooth the photometric characteristic changes includes adjusting pixel values of the time-compressed video's frames based on the computed filters.

10. A method as described in claim 1, further comprising computing the measure of photometric similarity between neighboring frames of the time-compressed video that include the adjacent frames.

11. A method as described in claim 10, further comprising determining outlier frames of the time-compressed video based on the measure of photometric similarity, the weights further indicating that the photometric transformations involving the outlier frames influence the filters less than the photometric transformations that do not involve the outlier frames.

12. A method as described in claim 1, further comprising displaying the photometrically stabilized time-compressed video via a display device.

13. A system implemented in a digital medium environment to reduce at least some photometric characteristic changes of time-compressed video, the system comprising:
   at least one processor; and
   memory having stored thereon computer-readable instructions that are executable by the at least one processor to perform operations comprising:

determining photometric transformations between adjacent frames of a time-compressed video that describe how photometric characteristics change between the adjacent frames;

computing filters to smooth photometric characteristic changes across the time-compressed video that are due to video capturing device adjustments, the filters computed as combinations of the determined photometric transformations by combining the determined photometric transformations according to weights indicating that the photometric transformations between similar frames of the time- compressed video, as indicated by a measure of photometric similarity, influence the filters more than the photometric transformations between less similar frames; and generating digital content comprising a photometrically stabilized time-compressed video by using the computed filters to smooth the photometric characteristic changes.

14. A system as described in claim 13, wherein the filters are computed to keep from smoothing at least one photometric characteristic change that is due to objects captured in a scene of the time-compressed video changing.

15. A system as described in claim 13, further comprising a video capturing device to capture video content, and the operations further comprising generating the time-compressed video by selecting a subset of frames from the captured video content.

16. A system as described in claim 13, wherein the measure of photometric similarity is Earth Mover's Distance (EMD).

17. In a digital medium environment, a method implemented by a computing device, the method comprising:

computing, by the computing device, a measure of photometric similarity between frames of a time-compressed video;

computing, by the computing device, weights indicative of an amount photometric characteristics corresponding to a given frame of the time-compressed video are to be adjusted using photometric characteristics of neighboring frames, the weights being computed based on the computed measure of photometric similarity;

computing, by the computing device, weighted filters for each frame of the time-compressed video by combining the weights computed for the frames, the weights indicating that photometric transformations between similar frames of the time-compressed video, as indicated by the measure of photometric similarity, influence the weighted filters more than the photometric-transformations between less similar frames; and smoothing, by the computing device, the photometric transformations between the frames of the time-compressed video, in part, by adjusting the photometric characteristics of the frames according to the weighted filters.

18. A method as described in claim 17, further comprising normalizing the weights computed for the frames in connection with combining the weights.

19. A method as described in claim 17, wherein at least one of the weights indicates to adjust the photometric characteristics of the given frame using the photometric characteristics of similar neighboring frames more than the photometric characteristics of less similar neighboring frames.

20. A method as described in claim 17, wherein at least one of the weights indicates to adjust the photometric characteristics of the given frame using the photometric characteristics of temporally-closer neighboring frames more than the photometric characteristics of temporally further neighboring frames.

* * * * *